US009108141B2

(12) United States Patent
Hauville

(10) Patent No.: US 9,108,141 B2
(45) Date of Patent: Aug. 18, 2015

(54) METHOD AND APPARATUS FOR PURGING UNWANTED SUBSTANCES FROM AIR

(75) Inventor: Francois Hauville, Ipswich, MA (US)

(73) Assignee: FIPAK Research And Development Company, Rowley, MA (US)

( * ) Notice: Subject to any disclaimer, the term of this patent is extended or adjusted under 35 U.S.C. 154(b) by 0 days.

(21) Appl. No.: 12/998,134

(22) PCT Filed: Sep. 21, 2009

(86) PCT No.: PCT/US2009/057666
§ 371 (c)(1),
(2), (4) Date: Jun. 28, 2011

(87) PCT Pub. No.: WO2010/033905
PCT Pub. Date: Mar. 25, 2010

(65) Prior Publication Data
US 2011/0259191 A1 Oct. 27, 2011

Related U.S. Application Data

(63) Continuation-in-part of application No. 12/465,434, filed on May 13, 2009, now Pat. No. 8,152,899.

(60) Provisional application No. 61/098,440, filed on Sep. 19, 2008, provisional application No. 61/244,218, filed on Sep. 21, 2009.

(51) Int. Cl.
B01D 53/04 (2006.01)
B01D 53/02 (2006.01)
(Continued)

(52) U.S. Cl.
CPC ............ B01D 53/02 (2013.01); B01D 39/1623 (2013.01); B01D 39/1676 (2013.01);
(Continued)

(58) Field of Classification Search
CPC ................. B01D 2239/0407; B01D 2239/065; B01D 2251/304; B01D 2251/606; B01D 2253/102; B01D 2253/34; B01D 2257/704; B01D 2259/4148; B01D 39/1623; B01D 39/1676; B01D 53/04; B01D 53/40; B01D 53/44; B10J 20/20; B10J 2220/62
USPC ........ 96/121, 132, 134, 135, 153, 154; 95/90, 95/116; 55/315, 318, 512, 524, 527, 55/DIG. 13, DIG. 36; 423/210
See application file for complete search history.

(56) References Cited

U.S. PATENT DOCUMENTS 3,944,403 A  3/1976  Simpson et al.
4,070,300 A  1/1978  Moroni et al.
(Continued)

FOREIGN PATENT DOCUMENTS

CN    2079081 U    6/1991
CN    2141873 Y    9/1993
(Continued)

Primary Examiner — Frank Lawrence
(74) Attorney, Agent, or Firm — Pandiscio & Pandiscio

(57) ABSTRACT

An air filter for purging unwanted substances from air, the air filter comprising: an acid-purging stage, wherein the acid-purging stage comprises an air-permeable skeleton which has an acid-neutralizing substance mounted thereto, wherein the air-permeable skeleton comprises fiberglass fibers, open cell polyurethane foam, etc. and the acid-neutralizing substance comprises sodium bicarbonate, and further wherein the sodium bicarbonate is secured to the fiberglass fibers, open cell polyurethane foam, etc. using an adhesive; and a solvent-purging stage, wherein the solvent-purging stage comprises solvent-purging granules captured between two air-permeable screens, and further wherein the solvent-purging granules comprise activated carbon granules.

11 Claims, 3 Drawing Sheets

(51) Int. Cl.
*B01D 39/16* (2006.01)
*B01D 39/20* (2006.01)
*B01D 53/40* (2006.01)
*B01D 53/44* (2006.01)
*B01D 53/82* (2006.01)
*B01J 20/20* (2006.01)

(52) U.S. Cl.
CPC ............ *B01D39/2017* (2013.01); *B01D 53/40* (2013.01); *B01D 53/44* (2013.01); *B01D 53/82* (2013.01); *B01J 20/20* (2013.01); *B01D 2239/0407* (2013.01); *B01D 2239/065* (2013.01); *B01D 2251/304* (2013.01); *B01D 2251/606* (2013.01); *B01D 2253/102* (2013.01); *B01D 2253/34* (2013.01); *B01D 2257/704* (2013.01); *B01D 2259/4148* (2013.01); *B01J 2220/62* (2013.01)

(56) References Cited

U.S. PATENT DOCUMENTS

| | | | |
|---|---|---|---|
| 4,981,501 A * | 1/1991 | Von Blucher et al. | 96/153 |
| 5,288,306 A | 2/1994 | Aibe et al. | |
| 5,372,788 A | 12/1994 | Kinoshita et al. | |
| 5,486,410 A | 1/1996 | Groeger et al. | |
| 5,626,820 A | 5/1997 | Kinkead et al. | |
| 5,662,728 A * | 9/1997 | Groeger | 96/153 |
| 5,772,738 A | 6/1998 | Muraoka | |
| 6,156,089 A | 12/2000 | Stemmer et al. | |
| 6,302,946 B1 | 10/2001 | Cronia et al. | |
| 6,402,819 B1 * | 6/2002 | De Ruiter et al. | 96/153 |
| 6,936,094 B2 | 8/2005 | Minemura et al. | |
| 7,029,516 B2 | 4/2006 | Campbell et al. | |
| 7,132,007 B1 | 11/2006 | Von Blücher et al. | |
| 7,285,157 B1 | 10/2007 | Dukes et al. | |
| 7,517,381 B2 | 4/2009 | Rohrbach et al. | |
| 7,758,836 B1 | 7/2010 | Huggins et al. | |
| 8,152,899 B2 * | 4/2012 | Hauville | 95/90 |
| 2003/0041733 A1 | 3/2003 | Seguin et al. | |
| 2004/0116025 A1 | 6/2004 | Gogins et al. | |
| 2006/0042210 A1 | 3/2006 | Dallas et al. | |
| 2006/0243134 A1 | 11/2006 | von Blucher et al. | |
| 2008/0010959 A1 | 1/2008 | Gillingham et al. | |
| 2008/0110342 A1 | 5/2008 | Ensor et al. | |
| 2008/0115670 A1 | 5/2008 | Hauville | |
| 2009/0221047 A1 | 9/2009 | Schindler et al. | |
| 2011/0259191 A1 | 10/2011 | Hauville | |

FOREIGN PATENT DOCUMENTS

| | | |
|---|---|---|
| JP | 9-38449 A | 2/1997 |
| JP | 2000-334244 | 12/2000 |
| WO | WO 2007/146201 | 12/2007 |
| WO | WO 2009/146201 | 12/2009 |

\* cited by examiner

METHOD AND APPARATUS FOR PURGING UNWANTED SUBSTANCES FROM AIR

REFERENCE TO PENDING PRIOR PATENT APPLICATION

This patent application:

(i) claims benefit of pending prior U.S. Provisional Patent Application Ser. No. 61/098,440, filed Sep. 19, 2008 by Francois Hauville and now issued as U.S. Pat. No. 8,152,900, for METHOD AND APPARATUS FOR PURGING UNWANTED SUBSTANCES FROM AIR AND/OR NEUTRALIZING UNWANTED SUBSTANCES IN AIR;

(ii) claims benefit of pending prior U.S. Provisional Patent Application Ser. No. 61/244,218, filed Sep. 21, 2009 by Francois Hauville for METHOD AND APPARATUS FOR PURGING UNWANTED SUBSTANCES FROM AIR; and (iii) is a continuation-in-part of prior U.S. Non-Provisional patent application Ser. No. 12/465,434, filed May 5, 2009 now U.S. Pat. No. 8,152,899 by Francis Hauville for METHOD AND APPARATUS FOR PURGING UNWANTED SUBSTANCES FROM AIR.

The three above-identified patent applications are hereby incorporated herein by reference.

FIELD OF THE INVENTION

This invention relates to air filters in general, and more particularly to air filters of the sort which purge unwanted substances from air, i.e. to air filters which remove unwanted substances from air and/or neutralize unwanted substances in air.

BACKGROUND OF THE INVENTION

Air filters are used to purge unwanted substances from air. By way of example but not limitation, air filters are commonly used in laboratories to purge unwanted substances from the air in fumehoods before the air is vented from the fumehood, e.g., to the atmosphere or to the ambient air of the laboratory.

In the laboratory application noted above, the air filter typically uses activated carbon granules to purge unwanted substances from the air. Activated carbon is generally preferred for use in air filters because the activated carbon is very effective in purging solvents from air. Furthermore, the use of activated carbon granules is generally highly advantageous, since the activated carbon granules are easily handled, and since they naturally pack into an enclosure with spaces therebetween so as to combine high surface area contact with excellent air flow. Typically, the activated carbon granules are disposed in a simple filter frame, captured between two opposing screens (e.g., meshes, grills, etc.) which pass air therethrough but retain the activated carbon granules therebetween.

While activated carbon granules are extremely effective in purging solvents from the air, they are largely ineffective in purging acids from the air. As a result, where acids may be used within a fumehood, special additives (e.g., rare earth metals, organic metal catalysts, etc.) must be added to the activated carbon granules in order to purge acids from the air. However, these additives tend to reduce the effective surface area of the activated carbon granules, thereby reducing filter capacity. Furthermore, these acid-purging additives are generally only modestly effective in purging acids from the air, and in many cases can comprise relatively toxic materials which may be released in the air by the air flow through the filter.

Thus, incorporating acid-purging additives with the activated carbon granules results in an air filter with reduced efficiency for purging solvents and which has only modest effectiveness for purging acids.

On account of the foregoing, there is a need for a new and improved air filter which is highly effective with respect to both solvents and acids and which works with high efficiency and without using toxic additives.

SUMMARY OF THE INVENTION

These and other objects of the present invention are addressed by the provision and use of a novel air filter which comprises at least two stages, an acid-purging stage and a solvent-purging stage. The acid-purging stage generally comprises an air-permeable skeleton having an acid-neutralizing substance mounted thereto. The solvent-purging stage generally comprises solvent-purging granules packed between two opposing screens (e.g., meshes, grills, etc.).

In one preferred form of the invention, there is provided an air filter for purging unwanted substances from air, the air filter comprising:

an acid-purging stage; and a solvent-purging stage.

In another form of the invention, there is provided an air filter for purging unwanted substances from air, the air filter comprising:

an acid-purging stage, wherein the acid-purging stage comprises an air-permeable skeleton which has an acid-neutralizing substance mounted thereto, wherein the air-permeable skeleton comprises fiberglass fibers and the acid-neutralizing substance comprises sodium bicarbonate, and further wherein the sodium bicarbonate is secured to the fiberglass fibers using an adhesive; and a solvent-purging stage, wherein the solvent-purging stage comprises solvent-purging granules captured between two air-permeable screens, and further wherein the solvent-purging granules comprise activated carbon granules.

In another form of the invention, there is provided an air filter for purging unwanted substances from air, the air filter comprising:

an acid-purging stage, wherein the acid-purging stage comprises an air-permeable skeleton which has an acid-neutralizing substance mounted thereto, wherein the air-permeable skeleton comprises open cell polyurethane foam and the acid-neutralizing substance comprises sodium bicarbonate, and further wherein the sodium bicarbonate is secured to the open cell polyurethane foam using an adhesive; and a solvent-purging stage, wherein the solvent-purging stage comprises solvent-purging granules captured between two air-permeable screens, and further wherein the solvent-purging granules comprise activated carbon granules.

In another form of the invention, there is provided a method for purging unwanted substances from air, the method comprising:

providing an air filter for purging unwanted substances from air, the air filter comprising:

an acid-purging stage; and a solvent-purging stage; and passing the air which is to be filtered through the air filter so as to purge unwanted substances from the air.

And in another form of the invention, there is provided a method for purging unwanted substances from air, the method comprising:

providing an air filter for purging unwanted substances from air, the air filter comprising:
an acid-purging stage, wherein the acid-purging stage comprises an air-permeable skeleton which has an acid-neutralizing substance mounted thereto, wherein the air-permeable skeleton comprises fiberglass fibers and the acid-neutralizing substance comprises sodium bicarbonate, and further wherein the sodium bicarbonate is secured to the fiberglass fibers using an adhesive; and
a solvent-purging stage, wherein the solvent-purging stage comprises solvent-purging granules captured between two air-permeable screens, and further wherein the solvent-purging granules comprise activated carbon granules; and
passing the air which is to be filtered through the air filter so as to purge unwanted substances from the air.

And in another form of the invention, there is provided a method for purging unwanted substances from air, the method comprising:
providing an air filter for purging unwanted substances from air, the air filter comprising:
an acid-purging stage, wherein the acid-purging stage comprises an air-permeable skeleton which has an acid-neutralizing substance mounted thereto, wherein the air-permeable skeleton comprises open cell polyurethane foam and the acid-neutralizing substance comprises sodium bicarbonate, and further wherein the sodium bicarbonate is secured to the open cell polyurethane foam using an adhesive; and
a solvent-purging stage, wherein the solvent-purging stage comprises solvent-purging granules captured between two air-permeable screens, and further wherein the solvent-purging granules comprise activated carbon granules; and
passing the air which is to be filtered through the air filter so as to purge unwanted substances from the air.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE INVENTION

In General

Figure 1:
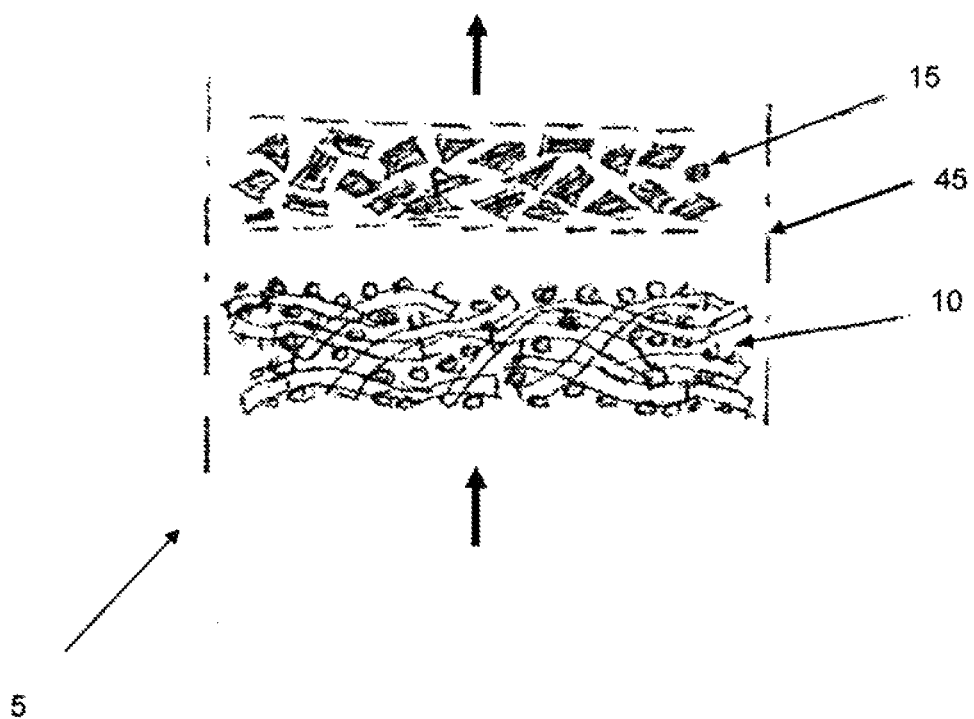
FIG. 1 is a schematic view showing a novel air filter formed in accordance with the present invention.

The present invention provides a new and improved air filter which is effective for purging both solvents and acids from the air with high efficiency. To this end, and looking now at FIGS. 1 and 1A, there is shown a novel air filter 5 formed in accordance with the present invention. Air filter 5 generally comprises two stages, an acid-purging stage 10 followed by a solvent-purging stage 15.

Acid-purging stage 10 generally comprises an air-permeable skeleton 20 having an acid-neutralizing substance 25 mounted thereto. In one preferred form of the invention, and looking now at FIG. 1, acid-purging stage 10 comprises fibers (e.g., fiberglass fibers) which have sodium bicarbonate adhered thereto. In another preferred form of the invention, and looking now at FIG. 1A, acid-purging stage 10 comprises an open cell foam (e.g., open cell polyurethane foam) with sodium bicarbonate adhered thereto.

Solvent-purging stage 15 generally comprises solvent-purging granules 30 packed between two opposing, air-permeable screens (e.g., meshes, grills, etc.) 35. In one preferred form of the invention, the solvent-purging granules comprise activated carbon granules.

As a result of this construction, when air is passed through air filter 5, the air first passes through acid-purging stage 10, where acid-neutralizing substance 25 (e.g., sodium bicarbonate) effectively neutralizes any acids which may be present in the air. Thereafter, the air passes through solvent-purging stage 15, where solvent-purging granules 30 (e.g., activated carbon granules) purge any solvents which may be present in the air.

Acid-Purging Stage 10

Looking next at FIGS. 1, 1A and 2-4, acid-purging stage 10 generally comprises an air-permeable skeleton 20 having an acid-neutralizing substance 25 mounted thereto.

In one preferred form of the invention, and looking now at FIG. 1, acid-purging stage 10 comprises fiberglass fibers which have sodium bicarbonate adhered thereto. Sodium bicarbonate is extremely effective in neutralizing acids, and is relatively inexpensive, but its powder-like consistency makes it difficult to use in an air filter, where high surface area contact is required. The present invention solves this difficulty, and makes it practical to use sodium bicarbonate in an air filter, by providing a new and improved method for supporting the sodium bicarbonate in an acid-purging stage.

Figure 2:
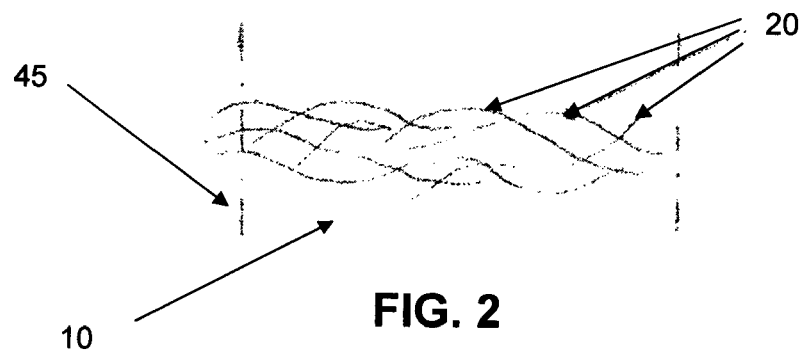
FIGS. 2-4 are schematic views showing how the acid-purging stage of the novel air filter can be fabricated.
Figure 3:
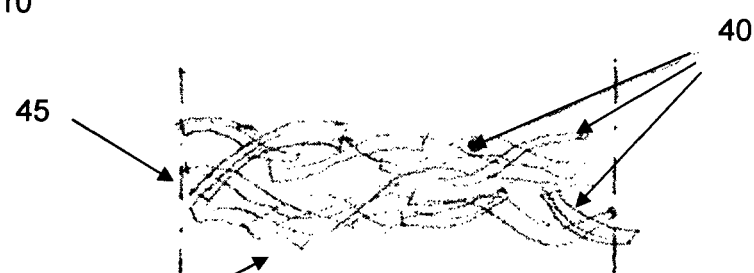
Figure 4:
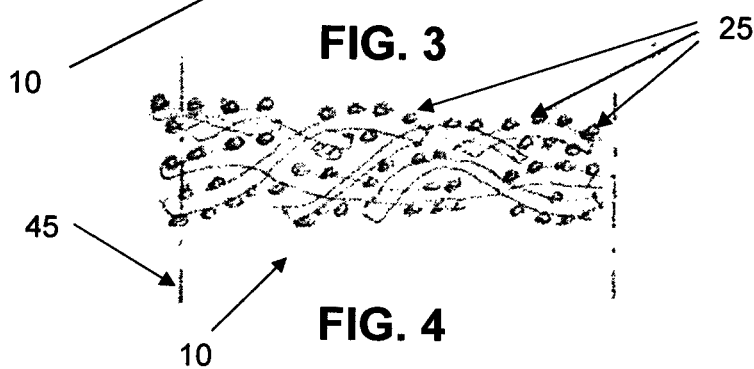

More particularly, and looking now at FIG. 2, acid-purging stage 10 preferably comprises an air-permeable mass of fiberglass fibers which together create the air-permeable skeleton 20. These fiberglass fibers are highly resistant to acids and bases, and easily pass air therethrough with nominal pressure loss. Looking next at FIG. 3, the fiberglass fibers are coated with an adhesive 40. Then, and looking now at FIG. 4, sodium bicarbonate powder is deposited on the fiberglass fibers, with adhesive 40 binding the sodium bicarbonate powder to the fiberglass fibers.

Thus it will be seen that the sodium bicarbonate is interspersed throughout, and adheres to, air-permeable skeleton 20, so that air passing therethrough makes excellent surface area contact with the sodium bicarbonate, whereupon the sodium bicarbonate can neutralize acids in the air.

If desired, acid-purging stage 10 can comprise an air-permeable skeleton 20 made with a structure and/or a material other than, or in addition to, fiberglass fibers (e.g., polyurethane fibers, an open cell foam, etc.), and/or acid-purging stage 20 can comprise an acid-neutralizing substance 25 other than, or in addition to, sodium bicarbonate (e.g., sodium hydroxide, potassium hydroxide, sodium carbonate, calcium carbonate, calcium bicarbonate, calcium hydroxide, etc.).

Figure 1A:
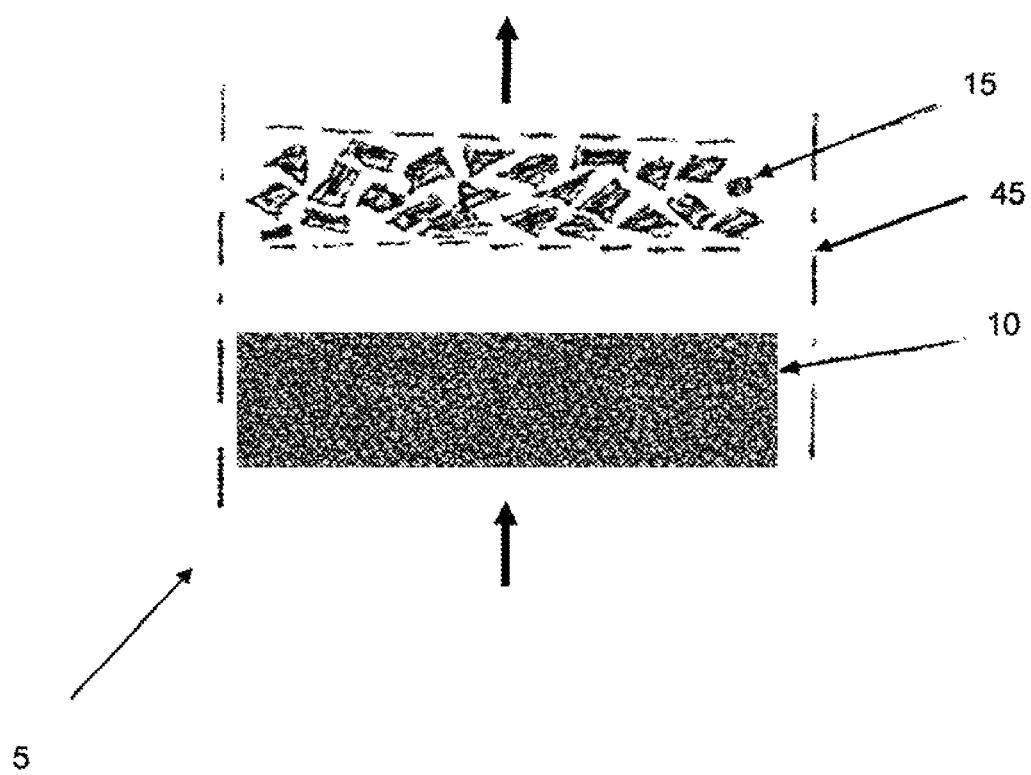
FIG. 1A is a schematic view showing another novel air filter formed in accordance with the present invention.

Thus, in another preferred form of the invention, and looking now at FIG. 1A, acid-purging stage 10 comprises an open cell foam with an acid-neutralizing substance adhered thereto. By way of example but not limitation, acid-purging stage 10 preferably comprises open cell polyurethane foam (preferably having a pore characteristic of 20 PPI, i.e., 20 pores per inch), having sodium bicarbonate adhered thereto.

This open cell polyurethane foam is highly resistant to acids and bases, and easily passes air therethrough with nominal pressure loss.

Solvent-Purging Stage 15

Figure 5:
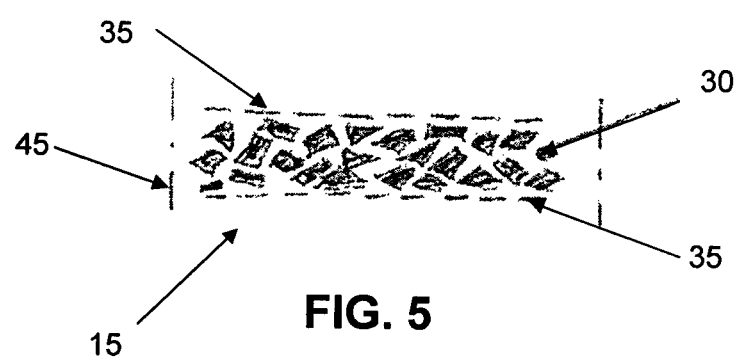
FIG. 5 is a schematic view showing further details of the solvent-purging stage of the novel air filter.

Looking now at FIG. 5, solvent-purging stage 15 generally comprises solvent-purging granules 30 packed between two opposing screens (e.g., meshes, grills, etc.) 35. In one preferred form of the invention, the solvent-purging granules comprise activated carbon granules captured between two opposing screens (e.g., meshes, grills, etc.) which pass air therethrough but retain the activated carbon granules therebetween.

Two-Stage Construction

Returning now to FIG. 1, it will be seen that novel air filter 5 comprises a filter frame 45 having mounted therein two filter stages, the acid-purging stage 10 followed by the solvent-purging stage 15. Acid-purging stage 10 comprises the air-permeable skeleton 20 (preferably fiberglass fibers or an open cell polyurethane foam) which has the acid-neutralizing substance 25 (preferably sodium bicarbonate) mounted thereto. Solvent-purging stage 15 comprises the solvent-purging granules 30 (preferably activated carbon granules). As a result of this construction, when air is passed through air filter 5, the air first passes through acid-purging stage 10, where acid-neutralizing substance 25 (e.g., sodium bicarbonate) neutralizes acids which may be present in the air. Thereafter, the air passes through solvent-purging stage 15, where solvent-purging granules 30 (e.g., activated carbon granules) purge solvents which may be present in the air. Thus, the novel air filter of the present invention is capable of purging both acids and solvents from the air passing through the filter.

Significantly, the foregoing construction provides substantial advantages over the prior art, since it separates the acid-purging operation from the solvent-purging operation, embodying each operation in a separate stage of a singular filter frame, thereby allowing each operation to be optimized for its own particular purpose without detracting from the other operation.

More particularly, the acid-purging stage of the present invention is optimized by, preferably, using highly effective and relatively inexpensive sodium bicarbonate, supported on an air-permeable skeleton structure (e.g., fiberglass fibers, an open cell polyurethane foam, etc.), to neutralize acid. In this respect it should be appreciated that sodium bicarbonate is significantly more effective in neutralizing acids from air than the rare earth metals and organic metal catalysts traditionally used in air filters to purge acids from the air. Significantly, the use of sodium bicarbonate in the air filter also eliminates the toxicity concerns which can be present when using the rare earth metals and organic metal catalysts of the prior art.

Furthermore, the solvent-purging stage of the present invention is optimized by, preferably, using highly effective activated carbon granules to purge solvents from air, but without the addition of the aforementioned acid-purging rare earth metals and organic metal catalysts which can reduce the solvent-purging capacity thereof.

Reversing the Order of the Stages

In the preceding discussion, acid-purging stage 10 precedes solvent-purging stage 15 in the air flow, i.e., air moving through the air filter moves through acid-purging stage 10 before it moves through solvent-purging stage 15. However, it will be appreciated that, if desired, the acid-neutralizing stage can follow the solvent-purging stage, i.e., air moving through the air filter can move through the solvent-purging stage before it moves through the acid-purging stage.

Further Aspects of the Invention

Thus it will be seen that the present invention is unique in a number of ways, including (i) the two-stage composite construction of the air filter, which combines an acid-purging stage with a solvent-purging stage, (ii) the use of sodium bicarbonate in an air filter, and (iii) the manner in which the sodium bicarbonate is supported within the air filter (e.g., on an air permeable skeleton such as fiberglass fibers, open cell polyurethane foam, etc.).

Furthermore, the present invention purges acids from the air without requiring the use of toxic additives.

And the present invention purges unwanted acids from the air without diminishing the capacity of the air filter to purge solvents from the air.

Also, the present invention utilizes an inexpensive acid-neutralizing substance to purge acids from the air.

Additionally, the present invention provides for the binding of powders to fibers and/or open cell foam which can be industrialized in an inexpensive manner.

And the present invention provides a novel air filter which is particularly advantageous for filtering the air in fume hoods.

Still other advantages of the present invention will be apparent to those skilled in the art in view of the present invention.

MODIFICATIONS

It is to be understood that the present invention is by no means limited to the particular constructions herein disclosed and/or shown in the drawings, but also comprises any modifications or equivalents within the scope of the invention.

What is claimed is:

1. A device for purging unwanted substances from air, the device comprising:
    a frame comprising a first opening for receiving untreated air, a second opening for discharging treated air, and a passageway extending between the first opening and the second opening;
    a discrete acid-purging stage disposed across the passageway for purging acid from the untreated air received through the first opening of the frame, the acid-purging stage comprising (i) an air-permeable skeleton comprising an open cell foam, and (ii) an acid-neutralizing substance mounted to the open cell foam and adapted to neutralize acid in the untreated air received through the first opening; and
    a discrete solvent-purging stage disposed across the passageway downstream of the discrete acid-purging stage for purging solvent from the acid-purged air exiting the discrete acid-purging stage and discharging the acid-purged and solvent-purged air out the second opening without passing the acid-purged and solvent-purged air back through the discrete acid-purging stage, wherein the solvent-purging stage comprises solvent-purging granules captured between two air-permeable screens.

2. A device according to claim 1 wherein the air-permeable skeleton comprises an open cell polyurethane foam.

3. A device according to claim 2 wherein the air-permeable skeleton comprises open cell polyurethane foam with a pore characteristic of 20 PPI.

4. A device according to claim 1 wherein the acid-neutralizing substance comprises sodium bicarbonate.

5. A device according to claim 4 wherein the sodium bicarbonate is secured to the air-permeable skeleton using an adhesive.

6. A device according to claim 1 wherein the acid-neutralizing substance comprises at least one from the group consisting of sodium bicarbonate, sodium hydroxide, potassium hydroxide, sodium carbonate, calcium carbonate, calcium bicarbonate, calcium hydroxide.

7. A device according to claim 1 wherein the acid-neutralizing substance comprises sodium bicarbonate, and further wherein the sodium bicarbonate is secured to the air-permeable skeleton using an adhesive.

8. A device according to claim 1 wherein the solvent-purging granules comprise activated carbon granules.

9. A device for purging unwanted substances from air, the device comprising:
- a frame comprising a first opening for receiving untreated air, a second opening for discharging treated air, and a passageway extending between the first opening and the second opening;
- a discrete acid-purging stage disposed across the passageway for purging acid from the untreated air received through the first opening of the frame, the acid-purging stage comprising (i) an air-permeable skeleton comprising an open cell polyurethane foam, and (ii) an acid-neutralizing substance mounted to the open cell polyurethane foam and adapted to neutralize acid in the untreated air received through the first opening, wherein the acid-neutralizing substance comprises sodium bicarbonate, and further wherein the sodium bicarbonate is secured to the open cell polyurethane foam using an adhesive; and
- a discrete solvent-purging stage disposed across the passageway downstream of the discrete acid-purging stage for purging solvent from the acid-purged air exiting the discrete acid-purging stage and discharging the acid-purged and solvent-purged air out the second opening without passing the acid-purged and solvent-purged air back through the discrete acid-purging stage, wherein the solvent-purging stage comprises solvent-purging granules captured between two air-permeable screens, and further wherein the solvent-purging granules comprise activated carbon granules.

10. A method for purging unwanted substances from air, the method comprising:
- providing a device for purging unwanted substances from air, the device comprising:
  - a frame comprising a first opening for receiving untreated air, a second opening for discharging treated air, and a passageway extending between the first opening and the second opening;
  - a discrete acid-purging stage disposed across the passageway for purging acid from the untreated air received through the first opening of the frame, the acid-purging stage comprising (i) an air-permeable skeleton comprising an open cell foam, and (ii) an acid-neutralizing substance mounted to the open cell foam and adapted to neutralize acid in the untreated air received through the first opening; and
  - a discrete solvent-purging stage disposed across the passageway downstream of the discrete acid-purging stage for purging solvent from the acid-purged air exiting the discrete acid-purging stage and discharging the acid-purged and solvent-purged air out the second opening without passing the acid-purged and solvent-purged air back through the discrete acid-purging stage, wherein the solvent-purging stage comprises solvent-purging granules captured between two air-permeable screens; and
- passing the air which is to be treated through the device so as to purge unwanted substances from the air.

11. A method for purging unwanted substances from air, the method comprising:
- providing a device for purging unwanted substances from air, the device comprising:
  - a frame comprising a first opening for receiving untreated air, a second opening for discharging treated air, and a passageway extending between the first opening and the second opening;
  - a discrete acid-purging stage disposed across the passageway for purging acid from the untreated air received through the first opening of the frame, the acid-purging stage comprising (i) an air-permeable skeleton comprising an open cell polyurethane foam, and (ii) an acid-neutralizing substance mounted to the open cell polyurethane foam and adapted to neutralize acid in the untreated air received through the first opening, wherein the acid-neutralizing substance comprises sodium bicarbonate, and further wherein the sodium bicarbonate is secured to the open cell polyurethane foam using an adhesive; and
  - a discrete solvent-purging stage disposed across the passageway downstream of the discrete acid-purging stage for purging solvent from the acid-purged air exiting the discrete acid-purging stage and discharging the acid-purged and solvent-purged air out the second opening without passing the acid-purged and solvent-purged air back through the discrete acid-purging stage, wherein the solvent-purging stage comprises solvent-purging granules captured between two air-permeable screens, and further wherein the solvent-purging granules comprise activated carbon granules; and
- passing the air which is to be treated through the device so as to purge unwanted substances from the air.

\* \* \* \* \*